United States Patent
Pill et al.

(10) Patent No.: US 11,274,582 B2
(45) Date of Patent: Mar. 15, 2022

(54) FLOW HOOD ASSEMBLY

(71) Applicant: Perkins Engines Company Limited, Peterborough (GB)

(72) Inventors: Richard Pill, Peterborough (GB); Andrew Keen, Peterborough (GB); Srikanth Tummala, Peterborough (GB); Susannah Freeman, Peterborough (GB); Venkata Sirisha Inkollu, Peterborough (GB); Sean Butler, Peterborough (GB)

(73) Assignee: Perkins Engines Company Limited, Peterborough (GB)

( * ) Notice: Subject to any disclaimer, the term of this patent is extended or adjusted under 35 U.S.C. 154(b) by 16 days.

(21) Appl. No.: 16/465,027

(22) PCT Filed: Dec. 18, 2017

(86) PCT No.: PCT/EP2017/083319
§ 371 (c)(1),
(2) Date: May 29, 2019

(87) PCT Pub. No.: WO2018/114809
PCT Pub. Date: Jun. 28, 2018

(65) Prior Publication Data
US 2019/0323397 A1 Oct. 24, 2019

(30) Foreign Application Priority Data
Dec. 22, 2016 (GB) ..................... 1621977

(51) Int. Cl.
*F01N 3/021* (2006.01)
*F01N 13/00* (2010.01)
(Continued)

(52) U.S. Cl.
CPC .......... *F01N 3/021* (2013.01); *F01N 3/2892* (2013.01); *F01N 13/009* (2014.06);
(Continued)

(58) Field of Classification Search
CPC .... F01N 3/0211; F01N 3/2892; F01N 3/2066; F01N 3/021; F01N 2240/20;
(Continued)

(56) References Cited

U.S. PATENT DOCUMENTS

| 8,820,059 | B1 | 9/2014 | Fahrenkrug et al. |
| 8,978,364 | B2 | 3/2015 | Olivier et al. |

(Continued)

FOREIGN PATENT DOCUMENTS

| CN | 203835497 U | 9/2014 |
| CN | 105392972 B | 8/2018 |

(Continued)

OTHER PUBLICATIONS

European Search Report for related Application No. 1621977.6; dated May 17, 2017.
(Continued)

*Primary Examiner* — Ngoc T Nguyen

(57) ABSTRACT

A flow hood assembly for an engine aftertreatment system having a particulate filter and a selective catalytic reduction device is disclosed. An outer case defines a cavity, the outer case having an inlet and an outlet formed therein, and a neck section formed between the inlet and the outlet. A socket in the outer case is in an opposed relationship to the outlet and is shaped to receive an injector that introduces a reducing agent into the flow of exhaust gases. A baffle reduces a cross-sectional area of the cavity at the neck section to increase exhaust gas velocity at a sensor positioned at the neck section. A deflector member in the cavity between the
(Continued)

baffle and the socket directs a portion of the exhaust gases towards the socket and across the injector nozzle.

15 Claims, 5 Drawing Sheets

(51) Int. Cl.
*F01N 3/28* (2006.01)
*F01N 3/20* (2006.01)
*F01N 3/10* (2006.01)

(52) U.S. Cl.
CPC .......... *F01N 13/0097* (2014.06); *F01N 3/106* (2013.01); *F01N 3/20* (2013.01); *F01N 13/008* (2013.01); *F01N 2240/20* (2013.01)

(58) Field of Classification Search
CPC ............... F01N 13/009; F01N 2610/00; F01N 2610/08; F01N 2610/1453
See application file for complete search history.

(56) References Cited

U.S. PATENT DOCUMENTS

| | | | |
|---|---|---|---|
| 9,347,355 | B2 | 5/2016 | Floyd et al. |
| 2009/0313979 | A1* | 12/2009 | Kowada .............. F01N 13/0097 60/297 |
| 2010/0257849 | A1* | 10/2010 | Kowada ................ F01N 3/2066 60/297 |
| 2012/0124983 | A1 | 5/2012 | Hong |
| 2014/0252132 | A1 | 9/2014 | Jeannel et al. |
| 2015/0101311 | A1 | 4/2015 | Keen et al. |
| 2015/0260071 | A1 | 9/2015 | Reichert et al. |
| 2015/0285200 | A1 | 10/2015 | Niaz et al. |
| 2016/0053661 | A1* | 2/2016 | Freeman ................ F01N 3/2066 60/301 |
| 2016/0053663 | A1* | 2/2016 | Davison .............. F01N 13/1822 60/301 |
| 2016/0061090 | A1 | 3/2016 | Anand et al. |
| 2016/0069239 | A1* | 3/2016 | Freeman ................ F01N 3/2892 60/324 |
| 2016/0076430 | A1* | 3/2016 | Freeman ................ F01N 13/009 60/301 |
| 2016/0305296 | A1 | 10/2016 | Tobe et al. |
| 2016/0326931 | A1* | 11/2016 | Freeman ............ F01N 13/1888 |
| 2016/0215673 | A1 | 12/2016 | Hashiguchi |
| 2016/0348557 | A1* | 12/2016 | Dalimonte .............. F01N 3/021 |

FOREIGN PATENT DOCUMENTS

| | | |
|---|---|---|
| DE | 102009029315 | 3/2011 |
| DE | 102012208034 A1 | 11/2013 |
| DE | 102013007523 A1 | 11/2014 |
| DE | 102015106876 A1 | 11/2015 |
| DE | 102015002224 A1 | 8/2016 |
| EP | 1601863 B1 | 1/2004 |
| WO | WO 2014/167355 A1 | 10/2014 |
| WO | 2014195576 A1 | 12/2014 |

OTHER PUBLICATIONS

International Search Report for related Application No. PCT/EP2017/083319; dated May 26, 2017.

* cited by examiner

FLOW HOOD ASSEMBLY

CROSS-REFERENCE TO RELATED APPLICATION

This Application is a 35 USC § 371 US National Stage filing of International Application No. PCT/EP2017/083319 filed on Dec. 18, 2017 which claims, priority under the Paris Convention to European Patent Application No. 1621977.6 filed on Dec. 22, 2016.

TECHNICAL FIELD

The present disclosure relates to a flow hood assembly, and in particular relates to a flow hood assembly for an engine aftertreatment system having a particulate filter and a selective catalytic reduction device.

BACKGROUND

Engine aftertreatment systems are used to reduce emissions in the exhaust stream of an internal combustion engine. One aftertreatment device used in engine aftertreatment systems is a particulate filter, used to remove particulate matter such as soot from the exhaust stream. Another aftertreatment device used in engine aftertreatment systems is a selective catalytic reduction (SCR) device, used to reduce NOx emissions in the exhaust stream. SCR devices typically inject a reducing agent into the exhaust stream which then reacts in a catalytic converter to reduce NOx emissions. In the case of a diesel engine, the reducing agent may be an aqueous urea solution made with urea and deionized water, known as diesel exhaust fluid (DEF). SCR devices are usually situated downstream from the particulate filter to avoid particulates in the exhaust stream from clogging up the catalytic converter.

Aftertreatment systems having an SCR device may include NOx sensors to measure the performance of the SCR device. Typically one NOx sensor is used before the SCR device and another NOx sensor after the SCR device to permit measurement of the amount of NOx emissions removed by the SCR device. Due to the low concentration of NOx present in exhaust gases, many such sensors have requirements on a minimum velocity of gas flow past the sensor.

In aftertreatment systems using an SCR device, the performance of the SCR device may reduce due to the reducing agent forming deposits that can build up on an injector nozzle and interfere with SCR device performance. One approach to reduce the amount of reducing agent deposited on the injector nozzle is to mount the injector with the injector nozzle vertical in use. Not all engine configurations permit the aftertreatment system to be installed with the injector in this orientation, however.

Various configurations of the aftertreatment devices in an engine aftertreatment system are possible. In some cases, the aftertreatment devices are provided in sequence in a generally linear fashion. In other cases, the aftertreatment devices are placed in a parallel configuration. Aftertreatment systems employing the parallel configuration typically use a flow hood to direct exhaust gases from the outlet of one aftertreatment device to the inlet of the next aftertreatment device.

SUMMARY OF THE DISCLOSURE

In an aspect of the present disclosure, a flow hood assembly is provided for an engine aftertreatment system having a particulate filter and a selective catalytic reduction device. The flow hood assembly comprises an outer case defining a cavity. The outer case has an inlet and an outlet formed therein, the inlet and the outlet being spaced apart along a longitudinal axis of the outer case, and a neck section formed between the inlet and the outlet. The inlet is configured for attachment to the particulate filter whereby exhaust gases from the particulate filter enter the cavity at the inlet and flow generally along the longitudinal axis toward the outlet. A socket is provided in the outer case in an opposed relationship to the outlet and shaped to receive an injector that introduces a reducing agent into the flow of exhaust gases, the injector having a nozzle that protrudes through an opening in the socket into the cavity. The outlet is configured for attachment to the selective catalytic reduction device, whereby the exhaust gases and reducing agent leave the cavity at the outlet and enter the selective catalytic reduction device. A sensor for detecting NOx in the flow of exhaust gases is provided at the neck section of the outer case, the sensor having a sensing end projecting into the cavity. A baffle is provided in the cavity, the baffle reducing a cross-sectional area of the cavity at the neck section. A deflector member provided in the cavity between the baffle and the socket, the deflector member being inclined towards the socket to direct a portion of the exhaust gases towards the socket and across the nozzle.

In another aspect of the present disclosure, a method is provided for directing a flow of exhaust gases flow from a particulate filter to a selective catalytic reduction device in an engine aftertreatment system. The method comprises providing an outer case defining a cavity, the outer case having an inlet and an outlet formed therein, the inlet and the outlet being spaced apart along a longitudinal axis of the outer case, and a neck section formed between the inlet and the outlet. The inlet is configured for attachment to the particulate filter whereby exhaust gases from the particulate filter enter the cavity at the inlet and flow generally along the longitudinal axis toward the outlet. A socket is provided in the outer case in an opposed relationship to the outlet and shaping the socket to receive an injector that introduces a reducing agent into the flow of exhaust gases, the injector having a nozzle that protrudes through an opening in the socket into the cavity. The outlet is configured for attachment to the selective catalytic reduction device, whereby the exhaust gases and reducing agent leave the cavity at the outlet and enter the selective catalytic reduction device. The method continues by providing a sensor for detecting NOx in the flow of exhaust gases at the neck section of the outer case, the sensor having a sensing end projecting into the cavity, providing a baffle in the cavity to reduce a cross-sectional area of the cavity at the neck section, and providing a deflector member in the cavity between the baffle and the socket, the deflector member being inclined towards the socket to direct a portion of the exhaust gases towards the socket and across the nozzle.

Other features and aspects of this disclosure will be apparent from the following description and the accompanying drawings.

DETAILED DESCRIPTION

The present disclosure relates to a flow hood assembly for an engine aftertreatment system having a particulate filter and a selective catalytic reduction device. The engine aftertreatment system may optionally include other aftertreatment devices known to those skilled in the art according to the type of engine the aftertreatment system will be used with. Embodiments of the present disclosure will be described with reference to a diesel engine, in which the aftertreatment system comprises a diesel particulate filter (DPF) and an SCR. The present disclosure may be used with any suitable engine known to those skilled in the art, such as a compression-ignition gas engine.

Reference will now be made in detail to specific embodiments or features, examples of which are illustrated in the accompanying drawings. Wherever possible, corresponding or similar reference numbers will be used throughout the drawings to refer to the same or corresponding parts. Moreover, references to various elements described herein, are made collectively or individually when there may be more than one element of the same type. However, such references are merely exemplary in nature. It may be noted that any reference to elements in the singular may also be construed to relate to the plural and vice-versa without limiting the scope of the disclosure to the exact number or type of such elements unless set forth explicitly in the appended claims.

Figure 1:
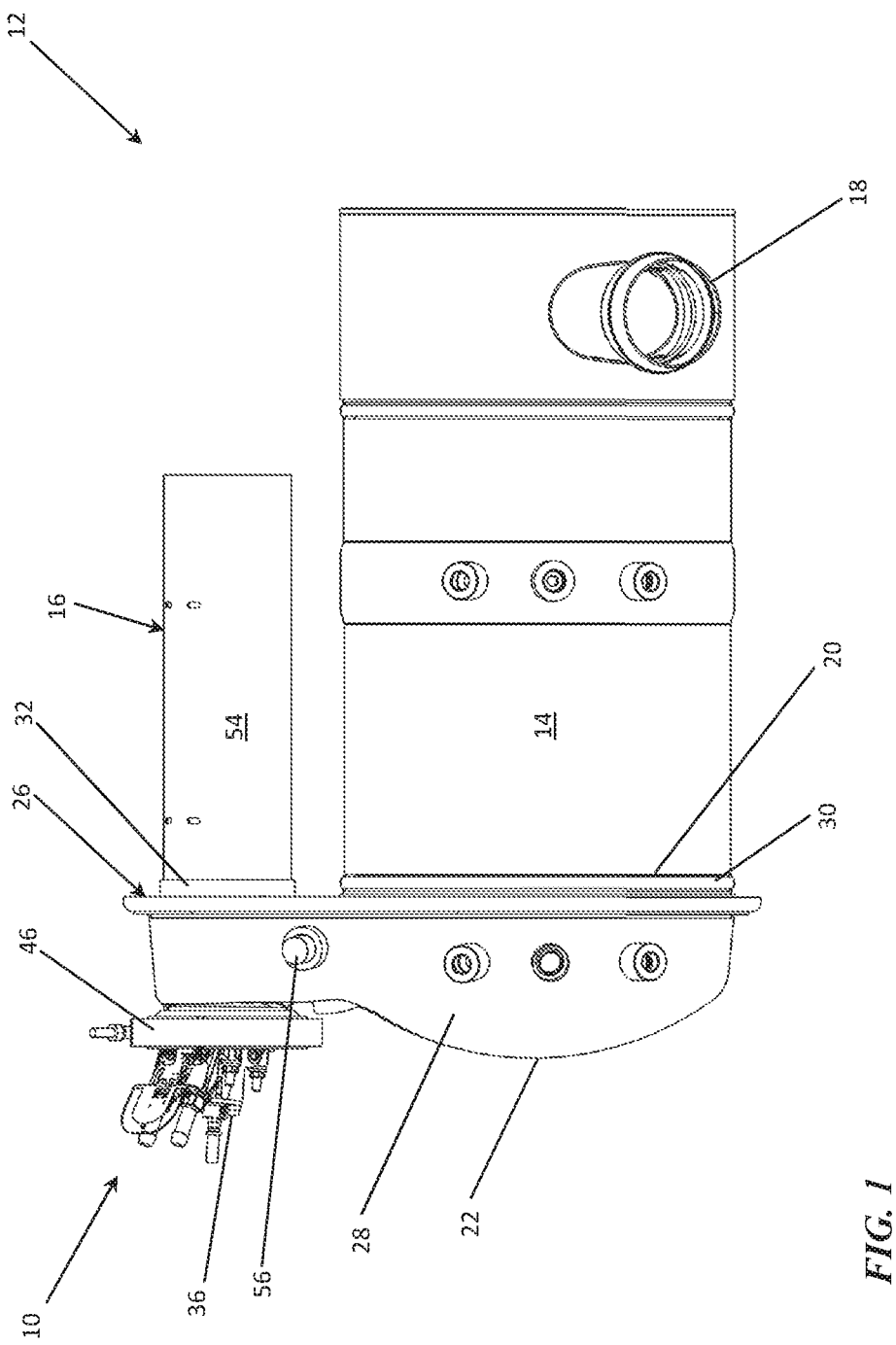
FIG. 1 illustrates side view of a flow hood assembly, connected to an aftertreatment system, according to one embodiment of the present disclosure.

FIG. 1 is a side illustration of a flow hood assembly 10 for an aftertreatment system 12 according to embodiments of the present disclosure. In the embodiment the aftertreatment system 12 is for a diesel engine (not shown) and includes a diesel particulate filter (DPF) 14 and a selective catalytic reduction (SCR) device 16. The DPF 14 has an inlet 18 and an outlet 20. The flow hood assembly 10 directs exhaust gases from the outlet 20 of the DPF 14 and into the SCR device 16 as will be described in more detail below. The inlet 18 of the DPF 14 connects to a source of exhaust gases (not shown), for instance an exhaust manifold of the engine or another aftertreatment device of the aftertreatment system 12, such as a diesel oxidation catalyst device. The DPF 14 and the SCR device 16 may be of any suitable design known to those skilled in the art.

The flow hood assembly 10 comprises an outer case 22 defining a cavity 24. The outer case 22 comprises a base 26 and a cover 28. An inlet 30 and an outlet 32 of the flow hood assembly 10 are formed in the base 26, the inlet 30 and the outlet 32 being spaced apart along a longitudinal axis A of the outer case 22. The outer case 22 has a neck section 34 formed between the inlet 30 and the outlet 32.

The inlet 30 is of a size and shape to permit attachment to the outlet 20 of the DPF 14. Exhaust gases from the DPF 14 enter the cavity 24 of the flow hood assembly 10 via the inlet 30 and flow generally along the longitudinal axis A toward the outlet 32, as represented by the arrows in FIG. 2.

A socket 35 is provided in the outer case 22 in an opposed relationship to the outlet 32. The socket 35 is shaped to receive an injector 36 that introduces a reducing agent into the flow of exhaust gases in the cavity 24. The injector 36 has a nozzle 38 that protrudes through an opening 40 in the socket 35 and into the cavity 24. The injector 36 injects a reducing agent into the exhaust gases in the cavity 24. The reducing agent may be DEF or any other suitable agent such as aqueous ammonia.

Figure 2:
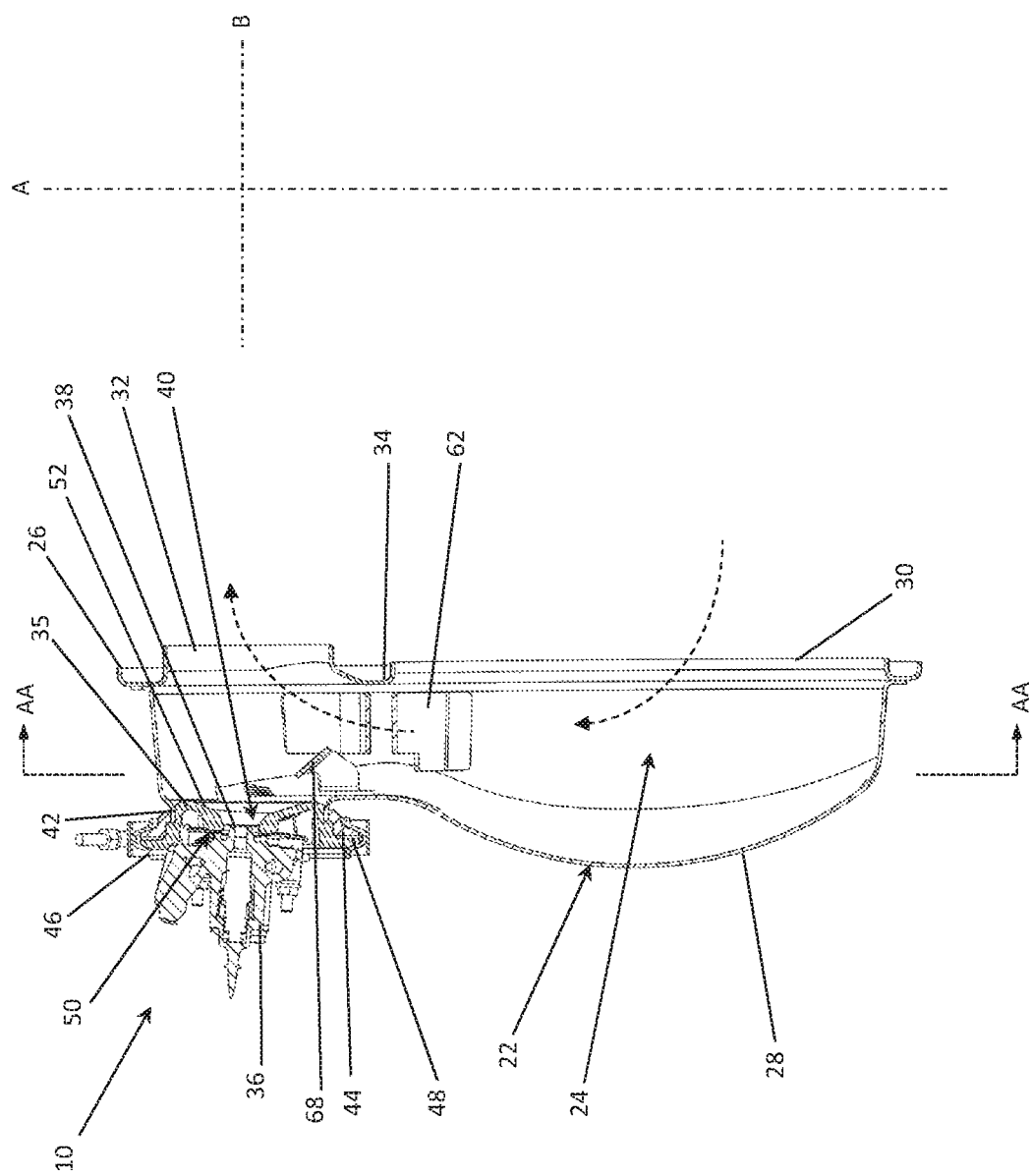
FIG. 2 is a cross-section view of the flow hood assembly of FIG. 1.

The socket 35 may be received within an aperture 42 formed in the cover 28, as shown in the embodiment illustrated in FIG. 2. A collar 44 may surround the aperture 42. In the illustrated embodiment shown in FIG. 2 the collar 44 is attached to the cover 28 by any suitable means, such as welding. In other embodiments the collar 44 may be formed integrally with the cover 28. The socket 35 may rest on the collar 44 and may be held fixed to the outer case 22 by a clamp 46 or other suitable fixing means. A gasket 48 may be provided between the socket 35 and the collar 44 to form a seal therebetween.

The socket 35 and the outlet 32 may be provided spaced apart and generally aligned along a lateral axis B of the outer case 22. Other arrangements of the socket 35 and the outlet 32 may also be used according to the orientation of the DPF 14 relative to the SCR device 16.

The socket 35 may further comprise a mounting section 50 to which the injector 36 is attached. The mounting section 50 may be inclined at an angle of 4 to 6 degrees to the longitudinal axis such that when the injector 36 is attached to the mounting section 50, the nozzle 38 is inclined to the lateral axis B by the same angle.

The socket 35 may have a concave surface 52 facing into the cavity 24. The opening 40 is provided in the concave surface 52. The concave surface 52 may assist in providing a flow of gases across the nozzle 38 to reduce buildup of reducing agent thereon.

The outlet 32 is of a size and shape to permit attachment to the SCR device 16, whereby exhaust gases and reducing agent leave the cavity 24 at the outlet 32 and enter the SCR device 16. The SCR device 16 may include a mixer 54 at its input; the remainder of the SCR device 16 is not shown in the drawings for clarity, however any suitable SCR device known to those skilled in the art for reducing NOx emissions may be employed.

The flow hood assembly 10 further comprises a sensor 56 for detecting NOx in the exhaust gases present in the cavity 24. The sensor 56 is provided at the neck section 34 of the outer case 22. The sensor 56 has a sensing end 58 projecting into the cavity 24 adjacent to one side 60 of the outer case 22.

Figure 3:
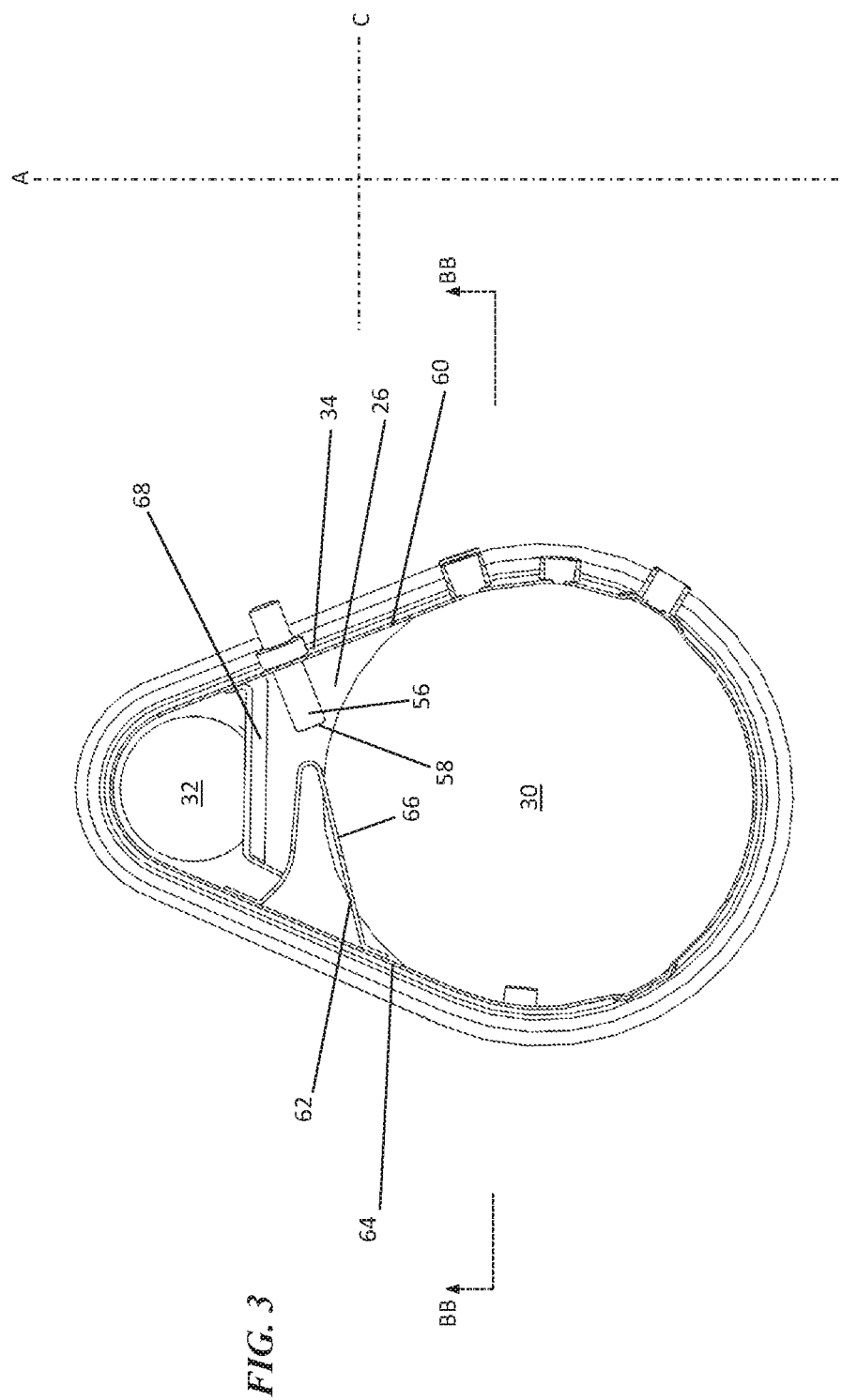
FIG. 3 is a view of the flow hood assembly of FIG. 1 through section AA.

A baffle 62 is provided in the cavity 24. The baffle 62 may extending from an other side 64 of the outer case 22 towards the sensing end 58 of the sensor 56. The other side 64 is opposite the one side 60 as shown in FIG. 3. The baffle 62 reduces a cross-sectional area of the cavity 24 at the neck section 34 to increase a velocity of the exhaust gases in the region of the sensing end 58 of the sensor 56.

The baffle 62 has a front surface 66 that faces towards the inlet 30. The front surface 66 may be inclined to a transverse axis C of the outer case 22 to direct the exhaust gases transversely around the baffle 62 and towards the sensing end 58 of the sensor 56, which may further increase the velocity of the exhaust gases at the sensing end 58 of the sensor 56. In a preferred embodiment, the velocity of the exhaust gases at the sensing end 58 of the sensor 56 is in the range of 15-18 m/s in use.

Figure 4:
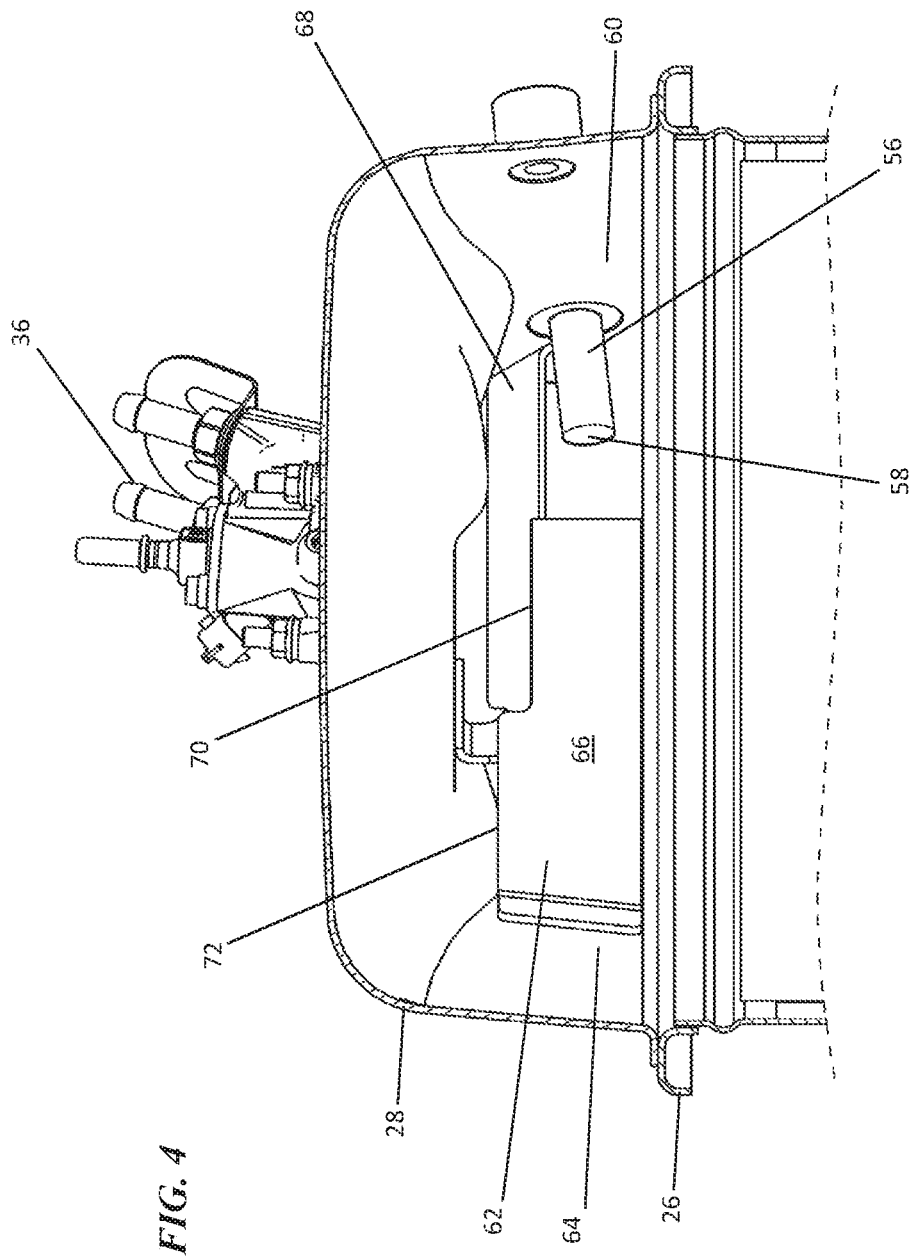
FIG. 4 is a view of the flow hood assembly of FIG. 1 through section BB.

Referring now to FIG. 4, the baffle 62 is provided in the cavity 24 adjacent the base 26. A portion of the exhaust gases flowing in the cavity 24 pass over the baffle 62, away from the base 26 and towards the socket 35.

A deflector member 68 is also provided in the cavity 24. The deflector member 68 is positioned between the baffle 62 and the socket 35 along the longitudinal axis A, and spaced from the base 26 along the lateral axis B of the outer case 22. As shown in FIG. 2, the deflector member 68 is inclined towards the socket 35 to direct a portion of the exhaust gases towards the socket 35 and across the nozzle 38. Directing a portion of the exhaust gases towards across the nozzle 38 assists in reducing a buildup of reducing agent on the nozzle 38. In one embodiment, a velocity of the exhaust gases at the nozzle of the injector is in the range of 3-10 m/s in use.

The deflector member may be inclined at any suitable angle from the lateral axis B towards the socket 35, such as an angle of 20 to 70 degrees, more preferably 30 to 50 degrees and most preferably between 35 to 45 degrees. While the deflector member 68 is illustrated as having a flat surface, other surfaces may also be used such as a surface curved towards the socket 35.

In some embodiments, the baffle 62 may include a cut-away portion 70 along an edge 72 remote from the base 26. The cut-away portion 70 may have a height commensurate with a spacing of the deflector member 68 from the base 26 such that the baffle 62 does not interfere with operation of the deflector member 68.

As described above, the mounting section 50 may be inclined at an angle to the longitudinal axis so that when the injector 36 is attached to the mounting section 50, the nozzle 38 is inclined to the lateral axis B by the same angle. In some embodiments it is preferred that the nozzle 38 is arranged in use such that it is angled downwards, from a horizontal axis, towards the ground as this may further assist with reducing a buildup of reducing agent on the nozzle 38. In the flow hood assembly 10 of the embodiment of the present disclosure, this can be achieved by loosening the clamp 46. The socket 35, along with the injector 36, may then be rotated until the desired orientation of the nozzle 38 with respect to the horizontal axis is found. This arrangement provides a convenient way of orientating the nozzle 38 in a desired position with respect to the horizontal axis. Further, in some instances the aftertreatment system 12 may be mounted in an engine in other orientations to that illustrated in the drawings. For instance, while in the drawings the SCR device 16 is shown as being above the DPF 14, in other orientations the SCR device 16 may be next to the DPF 14, below the DPF 14 or in any of a number of other orientations. Allowing the socket 35 to be rotatable with respect to the outer case 22 permits the nozzle 38 to be positioned in a desired orientation to the horizontal axis according to a mounting orientation of the aftertreatment system 12 about the lateral axis.

Figure 5:
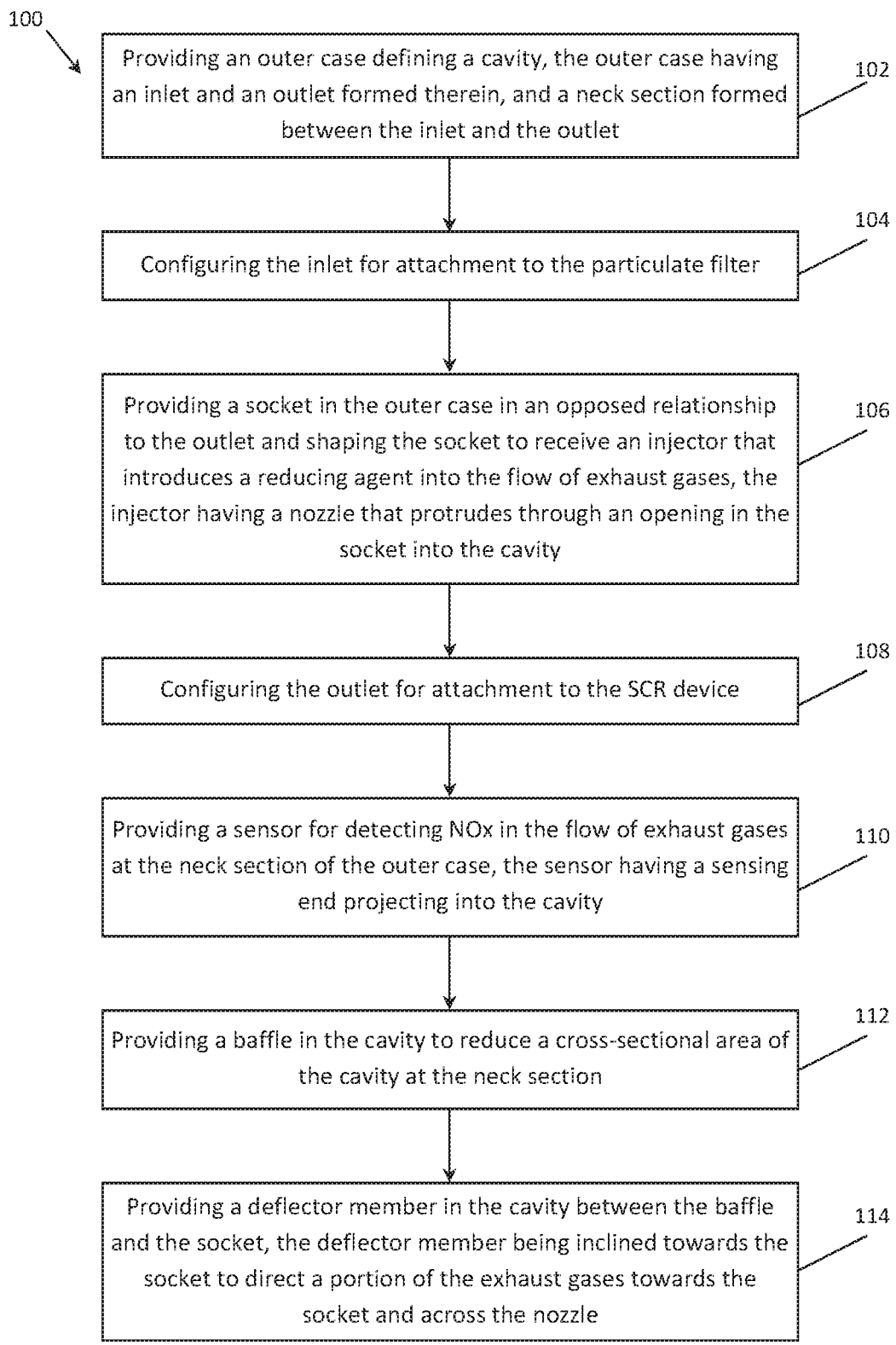
FIG. 5 illustrates a method for directing a flow of exhaust gases according to one embodiment of the present disclosure.

FIG. 5 illustrates a method 100 for directing a flow of exhaust gases flow from a DPF 14 to an SCR device 16 in an engine aftertreatment system in accordance with the present disclosure. At step 102, the method 100 includes providing an outer case 22 defining a cavity 24, the outer case 22 having an inlet 30 and an outlet 32 formed therein, the inlet 30 and the outlet 32 being spaced apart along a longitudinal axis A of the outer case 22, and a neck section 34 formed between the inlet 30 and the outlet 32. At step 104, the inlet 30 is configured for attachment to the DPF 14 whereby exhaust gases from the DPF 14 enter the cavity 24 at the inlet 30 and flow generally along the longitudinal axis A toward the outlet 32.

At step 106, a socket 35 is provided in the outer case 22 in an opposed relationship to the outlet 32. The socket 35 is shaped to receive an injector 36 that introduces a reducing agent into the flow of exhaust gases, the injector 36 having a nozzle 38 that protrudes through an opening 40 in the socket 35 and into the cavity 24.

At step 108, the outlet 32 is configured for attachment to the SCR device 16, whereby the exhaust gases and reducing agent leave the cavity 24 at the outlet 32 and enter the SCR device 16. A sensor 56 for detecting NOx in the flow of exhaust gases is provided at the neck section 34 of the outer case 22 at step 110, the sensor 56 having a sensing end 58 projecting into the cavity 24.

The method 100 continues at step 112, with providing a baffle 62 in the cavity 24 to reduce a cross-sectional area of the cavity 24 at the neck section 34. At step 114, a deflector member 68 is provided in the cavity 24 between the baffle 62 and the socket 35, the deflector member 68 being inclined towards the socket 35 to direct a portion of the exhaust gases towards the socket 35 and across the nozzle 38.

Various embodiments disclosed herein are to be taken in the illustrative and explanatory sense, and should in no way be construed as limiting of the present disclosure.

INDUSTRIAL APPLICATION

The present disclosure provides a flow hood assembly 10 and a method 100 for an aftertreatment system 12 having a particulate filter and a selective catalytic reduction device. The flow hood assembly 10 and the method disclosed herein are applicable to engines employing an aftertreatment system 12 such as those described and may assist in reducing a buildup of reducing agent on the nozzle 38 of an injector 36.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

The invention claimed is:

1. A flow hood assembly for an engine aftertreatment system having a particulate filter and a selective catalytic reduction device, the flow hood assembly comprising:
    an outer case defining a cavity, the outer case having an inlet and an outlet formed therein, the inlet and the outlet being spaced apart along a longitudinal axis of the outer case, and a neck section formed between the inlet and the outlet;
    the inlet configured for attachment to the particulate filter whereby exhaust gases from the particulate filter enter the cavity at the inlet and flow generally along the longitudinal axis toward the outlet;
    a socket provided in the outer case in an opposed relationship to the outlet and shaped to receive an injector that introduces a reducing agent into the flow of exhaust gases, the injector having a nozzle that protrudes through an opening in the socket into the cavity;
    the outlet configured for attachment to the selective catalytic reduction device, whereby the exhaust gases and reducing agent leave the cavity at the outlet and enter the selective catalytic reduction device;
    a sensor for detecting NOx in the flow of exhaust gases provided at the neck section of the outer case, the sensor having a sensing end projecting into the cavity;
    a baffle provided in the cavity, the baffle reducing a cross-sectional area of the cavity at the neck section; and a deflector member provided in the cavity between the baffle and the socket, the deflector member being inclined towards the socket to direct a portion of the exhaust gases towards the socket and across the nozzle.

2. The flow hood assembly of claim 1, wherein the sensing end of the sensor projects into the cavity adjacent one side of the outer case, the baffle extending from another side of the outer case towards the sensing end.

3. The flow hood assembly of claim 2, wherein a front surface of the baffle facing towards the inlet is inclined to a transverse axis to direct the exhaust gases towards the sensing end of the sensor.

4. The flow hood assembly of claim 1, wherein a velocity of the exhaust gases at the sensing end of the sensor is in the range of 15-18 m/s in use.

5. A flow hood assembly for an engine aftertreatment system having a particulate filter and a selective catalytic reduction device, the flow hood assembly comprising:
an outer case defining a cavity, the outer case having an inlet and an outlet formed therein, the inlet and the outlet being spaced apart along a longitudinal axis of the outer case, and a neck section formed between the inlet and the outlet;
the inlet configured for attachment to the particulate filter whereby exhaust gases from the particulate filter enter the cavity at the inlet and flow generally along the longitudinal axis toward the outlet;
a socket provided in the outer case in an opposed relationship to the outlet and shaped to receive an injector that introduces a reducing agent into the flow of exhaust gases, the injector having a nozzle that protrudes through an opening in the socket into the cavity;
the outlet configured for attachment to the selective catalytic reduction device, whereby the exhaust gases and reducing agent leave the cavity at the outlet and enter the selective catalytic reduction device;
a sensor for detecting NOx in the flow of exhaust gases provided at the neck section of the outer case, the sensor having a sensing end projecting into the cavity;
a baffle provided in the cavity, the baffle reducing a cross-sectional area of the cavity at the neck section; and
a deflector member provided in the cavity between the baffle and the socket, the deflector member being inclined towards the socket to direct a portion of the exhaust gases towards the socket and across the nozzle, the socket being provided in one face of the outer case, the baffle being provided in the cavity adjacent an opposed face of the outer case.

6. The flow hood assembly of claim 5, wherein the baffle includes a cut-away portion along an edge thereof, the cut-away portion having a height commensurate with the deflector member.

7. The flow hood assembly of claim 5, wherein the deflector member is inclined at an angle of 20 to 70 degrees from the longitudinal axis towards the socket.

8. The flow hood assembly of claim 7, wherein a velocity of the exhaust gases at the nozzle of the injector is in the range of 3-10 m/s in use.

9. The flow hood assembly of claim 8, wherein the socket and the outlet are provided spaced apart and aligned along a lateral axis.

10. The flow hood assembly of claim 9, wherein the socket has a concave surface facing into the cavity.

11. The flow hood assembly of claim 10, wherein the concave surface has an opening therein into which the nozzle of the injector is received.

12. The flow hood assembly of claim 11, wherein the socket further comprises a mounting section to which the injector is attached, the mounting section being configured such that the nozzle is inclined at an angle of 4 to 6 degrees to the lateral axis when the injector is attached to the socket.

13. The flow hood assembly of claim 12, wherein the socket is held fixed to the outer case by a clamp, the socket being rotatable with respect to the outer case when the clamp is loosened.

14. The flow hood assembly of claim 13, wherein the socket is rotated to a position where the nozzle is inclined at an angle of 4 to 6 degrees to the lateral axis.

15. A method for directing a flow of exhaust gases flow from a particulate filter to a selective catalytic reduction device in an engine aftertreatment system, the method comprising:
providing an outer case defining a cavity, the outer case having an inlet and an outlet formed therein, the inlet and the outlet being spaced apart along a longitudinal axis of the outer case, and a neck section formed between the inlet and the outlet;
configuring the inlet for attachment to the particulate filter whereby exhaust gases from the particulate filter enter the cavity at the inlet and flow generally along the longitudinal axis toward the outlet;
providing a socket in the outer case in an opposed relationship to the outlet and shaping the socket to receive an injector that introduces a reducing agent into the flow of exhaust gases, the injector having a nozzle that protrudes through an opening in the socket into the cavity;
configuring the outlet for attachment to the selective catalytic reduction device, whereby the exhaust gases and reducing agent leave the cavity at the outlet and enter the selective catalytic reduction device;
providing a sensor for detecting NOx in the flow of exhaust gases at the neck section of the outer case, the sensor having a sensing end projecting into the cavity;
providing a baffle in the cavity to reduce a cross-sectional area of the cavity at the neck section; and
providing a deflector member in the cavity between the baffle and the socket, the deflector member being inclined towards the socket to direct a portion of the exhaust gases towards the socket and across the nozzle.

* * * * *